Dec. 15, 1970  S. D. POOL ET AL  3,546,866
TREE SHAKER APPARATUS
Filed July 9, 1968  8 Sheets-Sheet 4
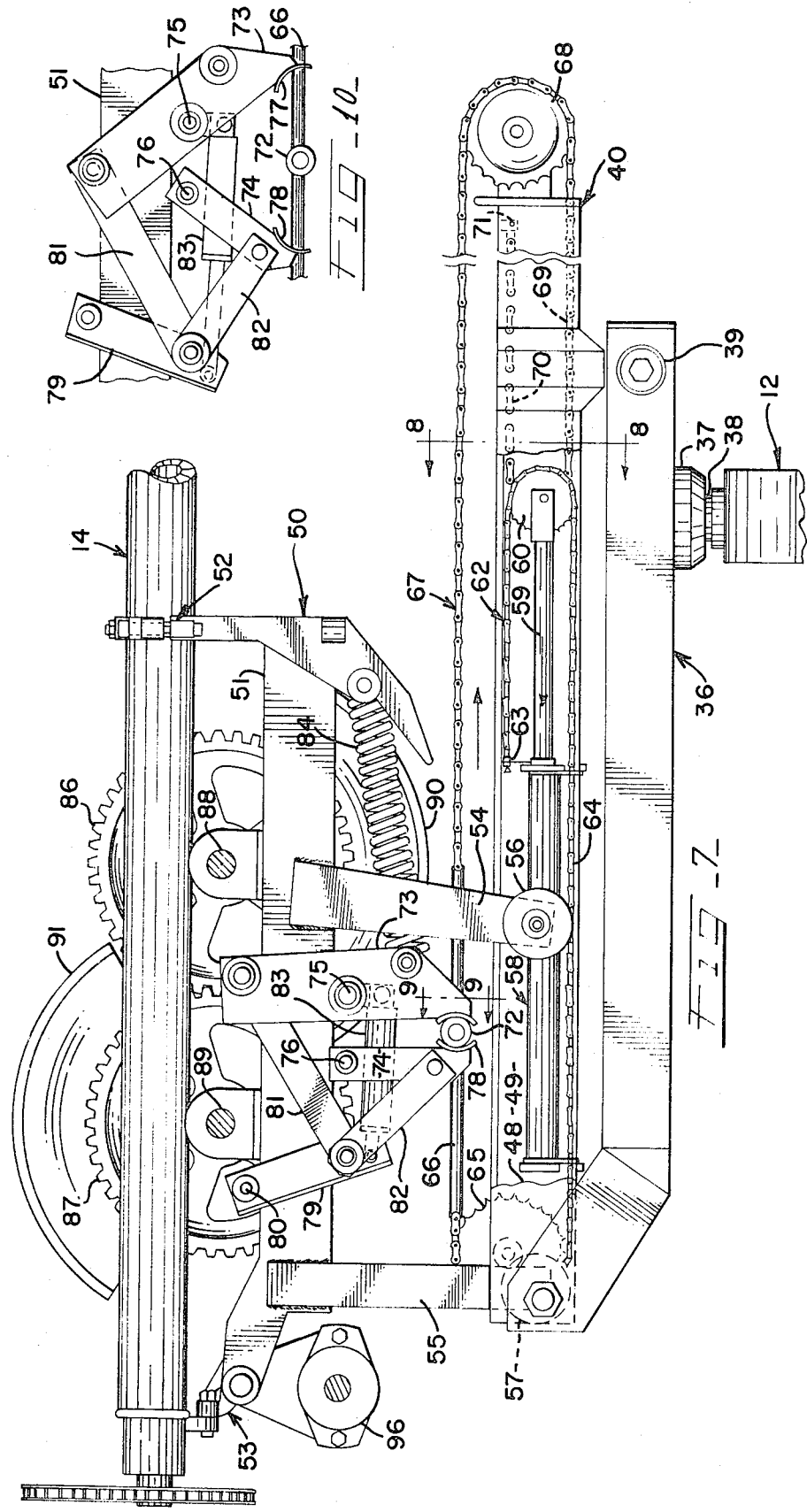

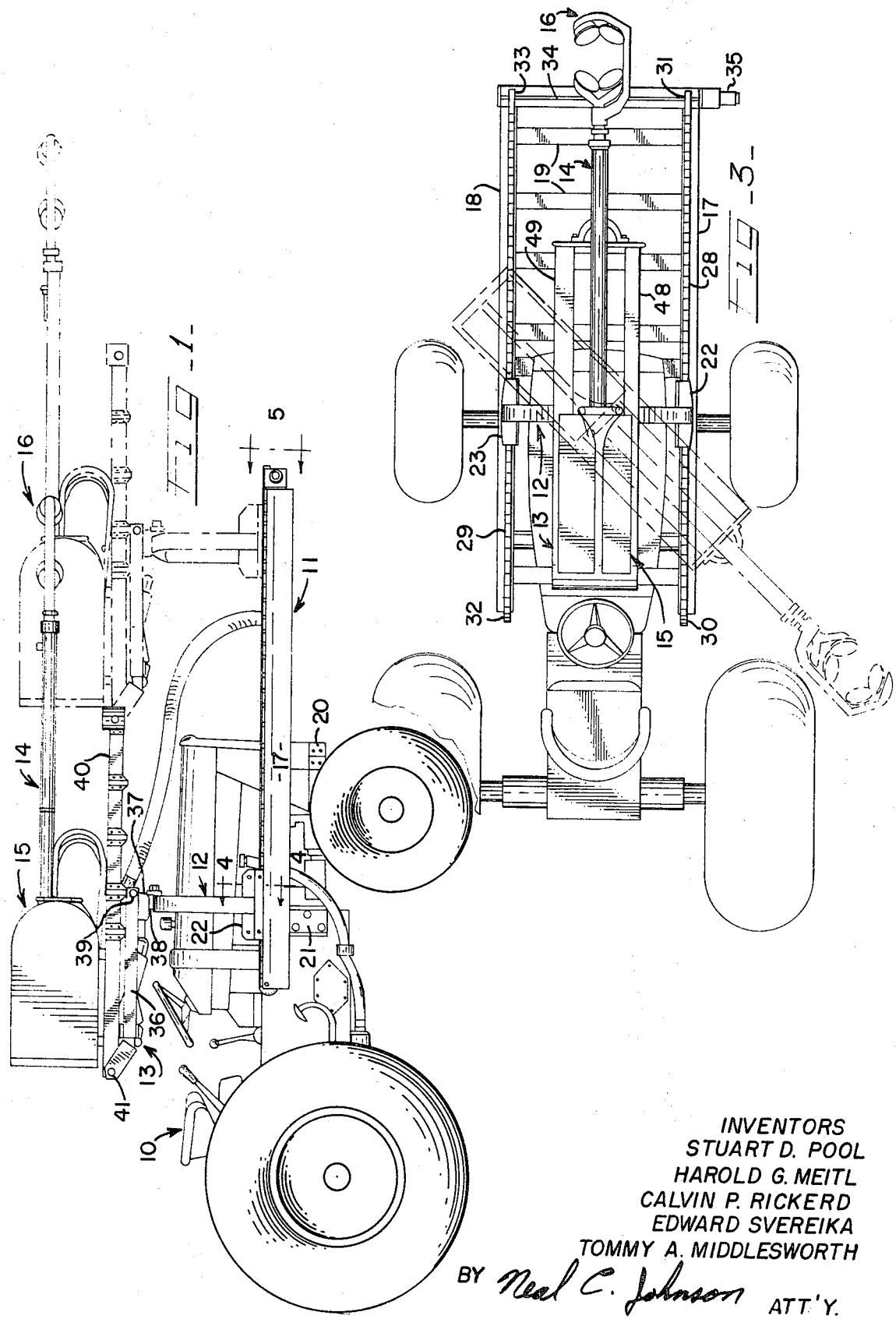

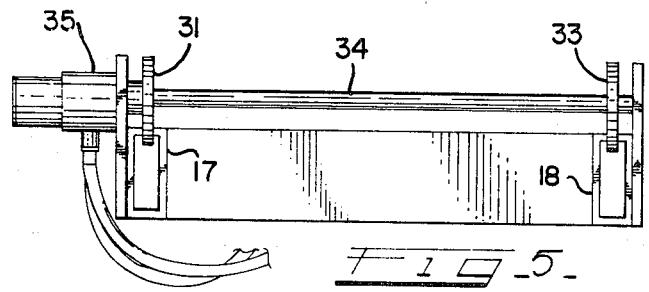
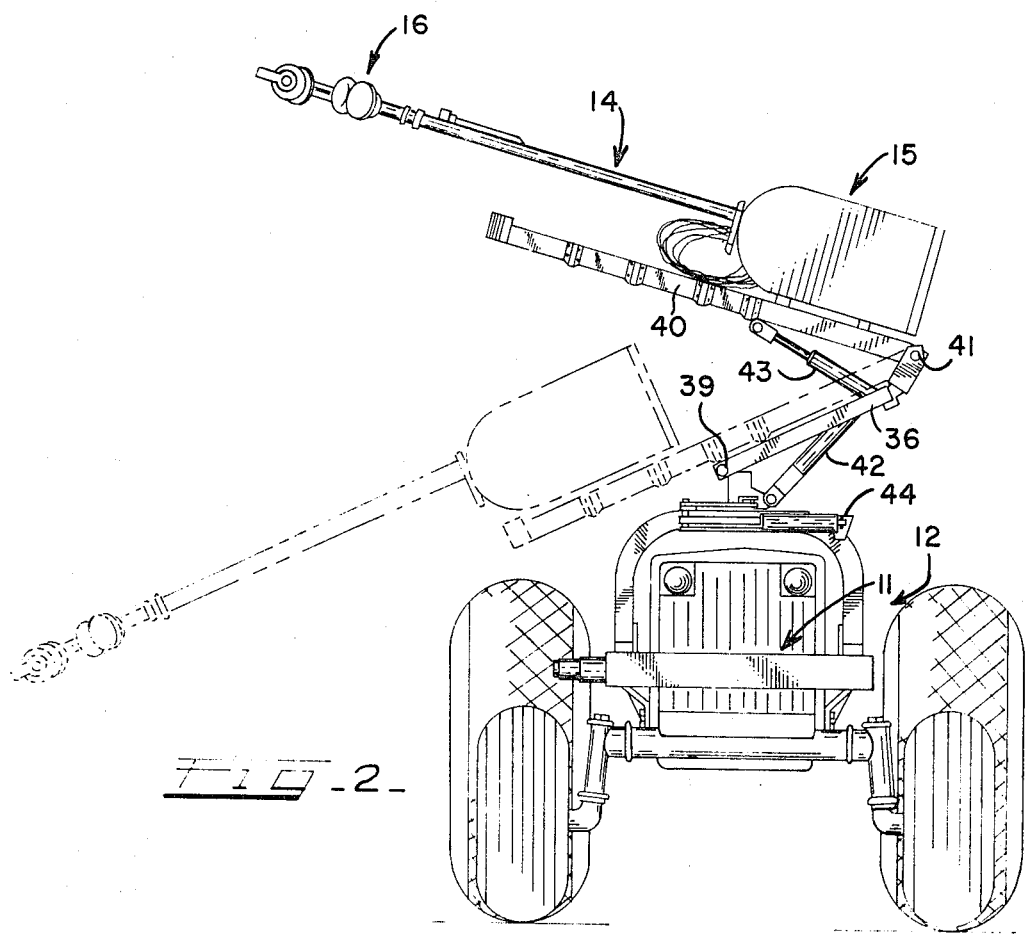

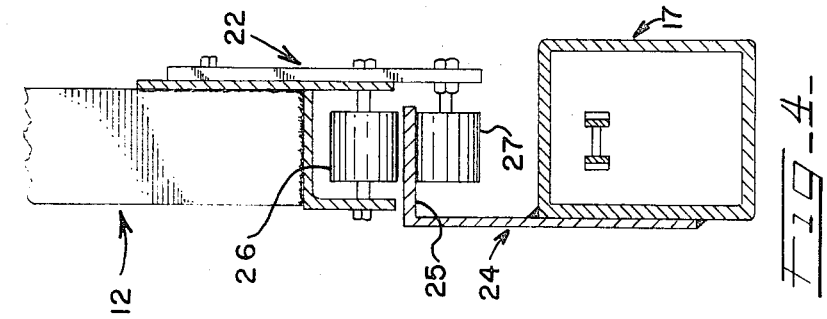
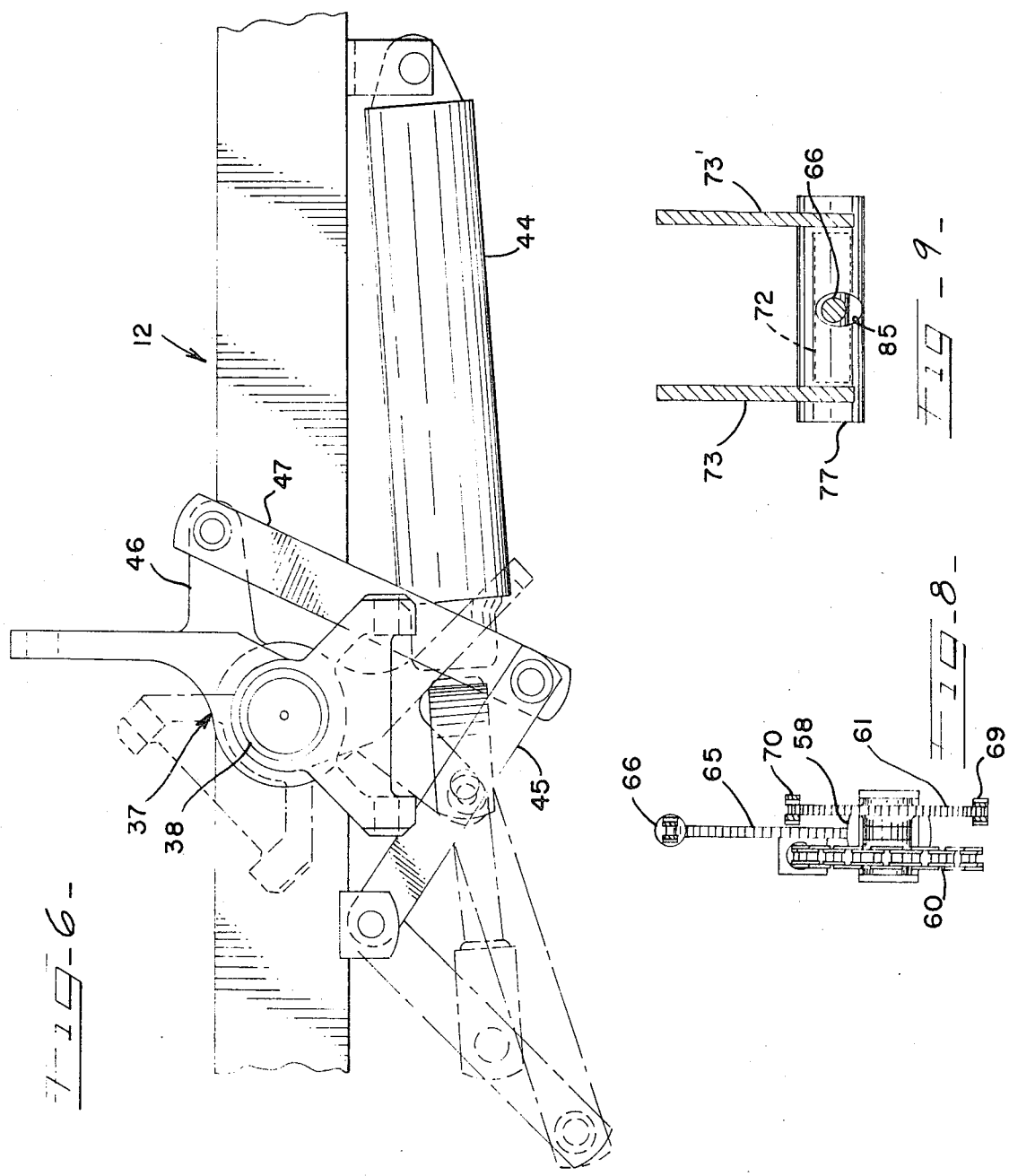

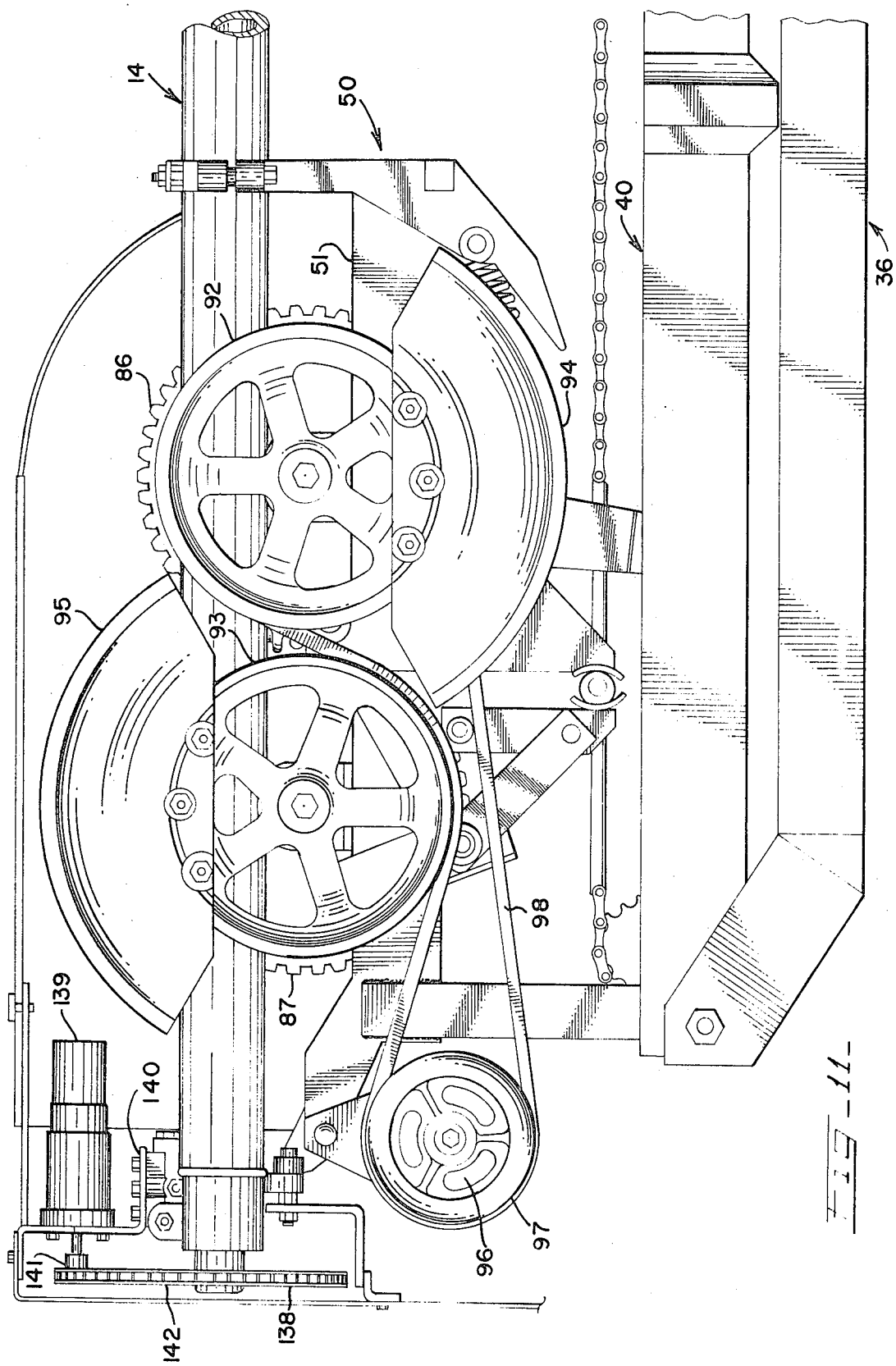

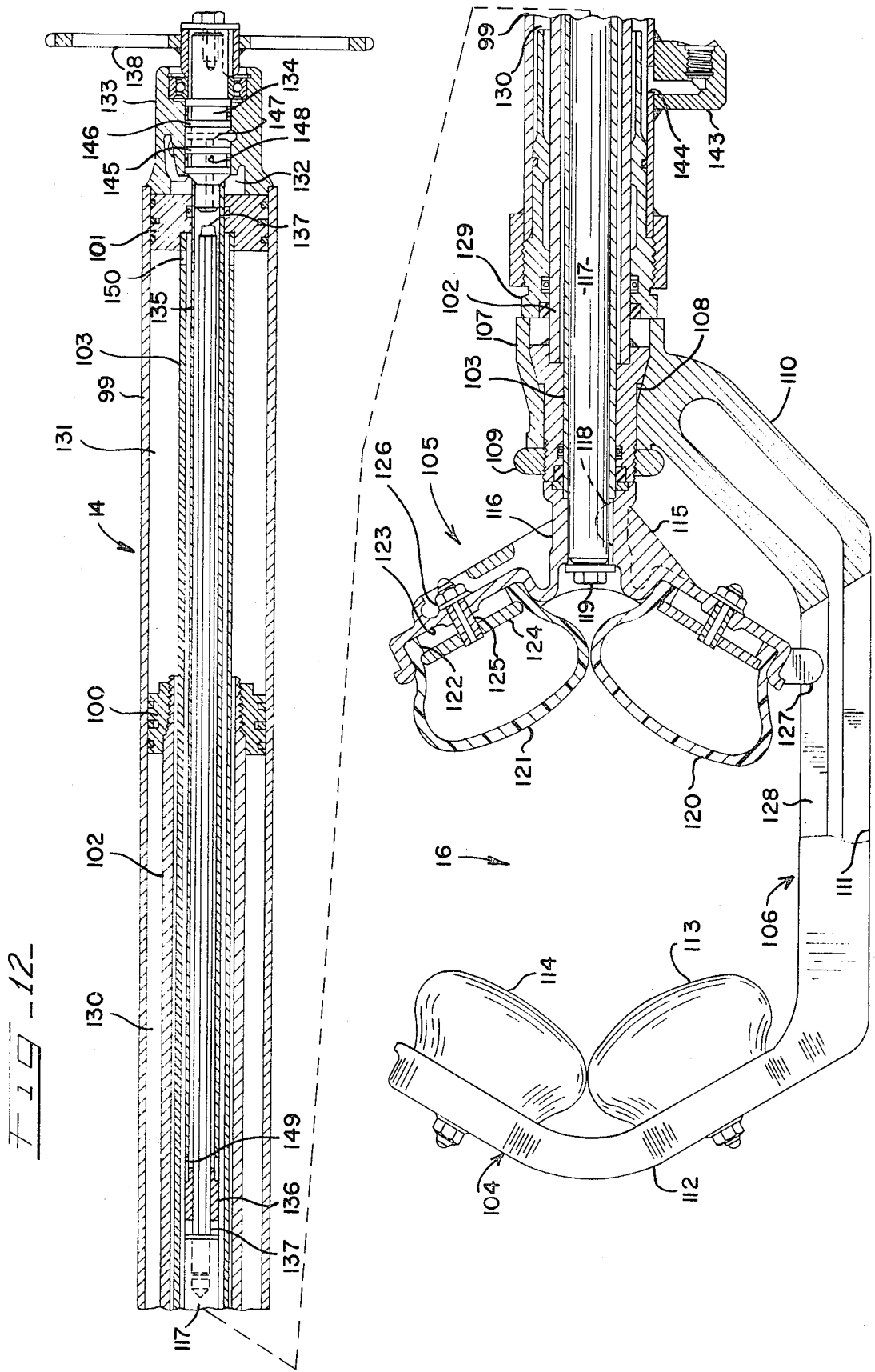

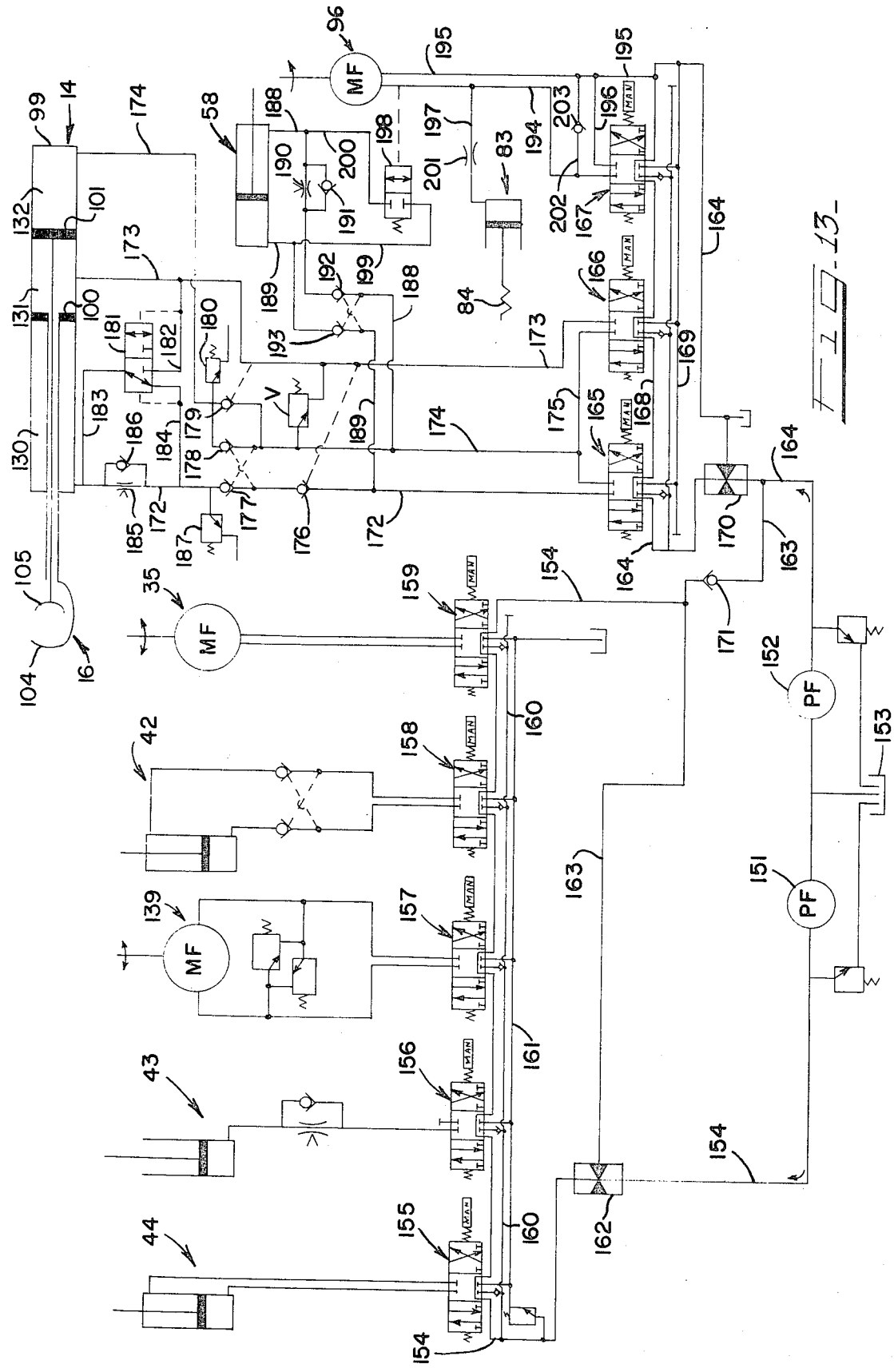

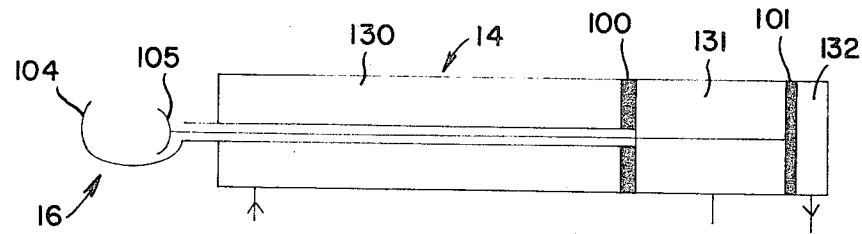
FIG-13A-
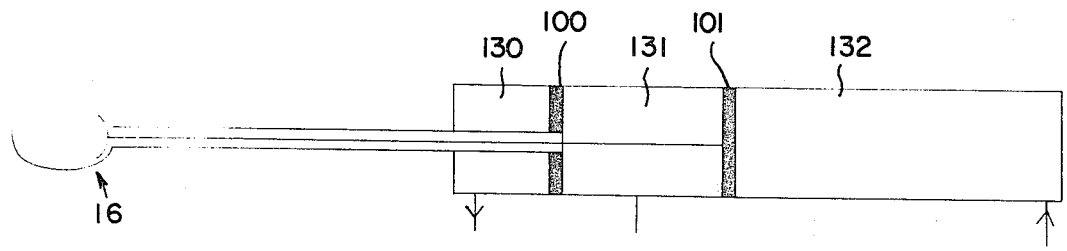
FIG-13B-
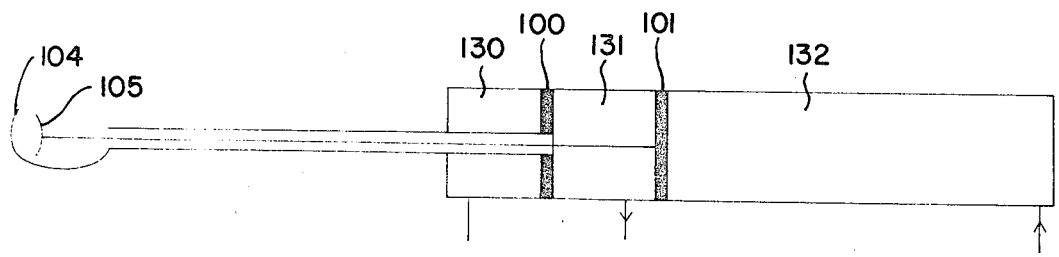
FIG-13C-
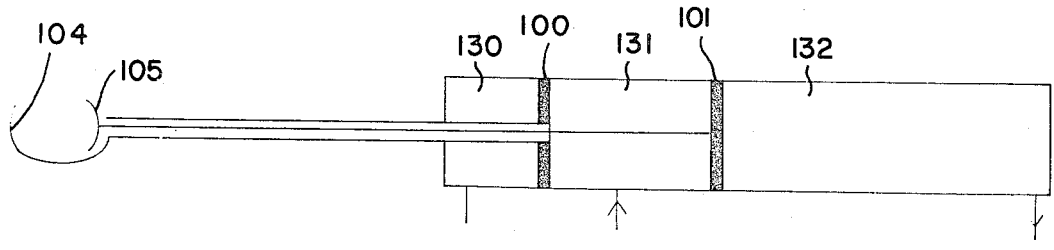
FIG-13D-

United States Patent Office 3,546,866
Patented Dec. 15, 1970

3,546,866
TREE SHAKER APPARATUS
Stuart D. Pool, Naperville, Harold G. Meitl, Clarendon Hills, Calvin P. Rickerd, La Grange Park, Edward Svereika, Chicago, and Tommy A. Middlesworth, Hinsdale, Ill., assignors to International Harvester Company, Chicago, Ill., a corporation of Delaware
Filed July 9, 1968, Ser. No. 743,436
Int. Cl. A01g 19/08
U.S. Cl. 56—328
20 Claims

ABSTRACT OF THE DISCLOSURE

A tree shaker apparatus mounted on a tractor and including an elongated boom having a clamp adapted to grip a tree for shaking fruit therefrom. The boom is received on a boom carriage assembly which is operable to raise and lower the boom and along which the boom is movable. The boom carriage assembly is swingably mounted on a yoke which straddles the tractor. A frame is mounted on the tractor for receiving the yoke which is movable along the frame for positioning the carriage assembly and boom relative to a tree to be gripped. An inertia shaker mechanism is mounted on the boom for reciprocating the boom when the clamp is gripping a tree.

BACKGROUND OF THE INVENTION

Field of the invention

The invention relates to fruit harvesting machines and more particularly to a device for gripping a tree to shake fruit therefrom.

Description of the prior art

A common problem with mechanized tree shaker devices concerns the lack of mobility and maneuverability of the machine to and between the work stations in a fruit tree grove. Normally such groves present narrowly confined areas within which to move and maneuver the machine between the trees to be gripped and shaken. Traditionally such machines are relatively large and cumbersome such that positioning and maneuvering the machine within the small areas presents time-consuming difficulties.

A factor contributing to the problem is that in many machines the boom and its supporting and operating structure are mounted proximate to or at an end of the mobile support (for example a tractor). The result is that the length of the machine becomes relatively great. Moreover the boom and the supporting and operating structure are not readily positionable relative to the tractor to provide an overall compact arrangement facilitating transport or movement of the machine between work stations.

Another problem involves a lack of flexibility of operation of the tree shaking machine when finally positioned proximate to a tree to be gripped and shaken. In only rare instances can all the fruit be shaken from a tree by gripping a single point on the tree. More usually the clamp structure must be moved several times to grip several branches of the tree in order to dislodge all the fruit therefrom. Conventional machines often lack the flexibility to enable positioning of the clamp structure at a variety of gripping positions without requiring that the machine itself be repositioned. This problem may be especially difficult when the shaker apparatus also mounts a catcher apron which when expanded into catching position fixes the position of the shaker apparatus relative to the tree.

A further problem common to tree shaker devices is the undesirable transmittal of vibrations of the shaker mechanism to the supporting structure during a tree shaking operation. While machines have been proposed which tend to reduce the vibrations, a problem remains in that the bending resistance of the various tree branches is highly variable. In the event a branch being shaken is highly flexible or even breaks, the decreased load on the shaker mechanism permits it to move back and forth in a relatively unrestricted manner. As a result, the shaker mechanism may exert sudden and extreme forces on its support structure causing damage to the apparatus before the operator can de-actuate the mechanism.

SUMMARY

With the foregoing in mind it is an object of the invention to provide a tree shaker apparatus which is characterized by mobility and ease of maneuverability within the narrowly confined work areas of fruit tree groves.

Another object is to provide a tree shaker apparatus including a tree gripping clamp wherein the clamp is readily positionable into a wide variety of positions relative to the apparatus to grip the branches of a tree without requiring repeated movement of the apparatus to dislodge all the fruit from the tree.

Another object is to provide a tree shaker apparatus including a boom and supporting structure therefor mounted on a mobile support wherein the boom and its supporting structure are movable relative to the mobile support to provide an overall compact arrangement greatly facilitating transport and movement of the apparatus.

Yet another object is to provide a tree shaker apparatus having a hydraulic control system permitting the operator to readily control all operations of the apparatus with ease and under positive control.

Still another object is to provide a tree shaker apparatus having an inertia shaker mechanism and support structure therefor which are cooperatively interrelated to prevent damage to the apparatus in the event a tree branch is gripped which is highly flexible or breaks during shaking.

A still further object is to provide a tree shaker apparatus including an inertia shaker mechanism and a boom movably mounted on a boom carriage assembly and further including a latch mechanism releasably interconnecting the boom and the boom carriage assembly and operative to release the boom with respect to the boom carriage assembly in response to actuation of the inertia shaker mechanism permitting reciprocation of the boom on the carriage assembly without transmitting vibration to the assembly.

Briefly, these and other objects and advantages of the invention are obtained by providing a tree shaker apparatus adapted for mounting on a mobile support and including a clamp adapted to grip a tree for shaking fruit therefrom. The apparatus includes a frame mountable on the mobile support for receiving a yoke slidably mounted thereon for movement to selected positions relative to the mobile support. A boom carriage assembly is pivotally mounted on the yoke and supports a boom movably mounted thereon and having the clamp mounted on an outer end of the boom. An inertia shaker mechanism is mounted on the boom for effecting longitudinal reciprocation of the boom with respect to the carriage assembly to thereby dislodge fruit from a tree engaged by the clamp.

BRIEF DESCRIPTION OF THE DRAWINGS

FIG. 1 is a side elevational view of the tree shaker apparatus of the invention mounted on a tractor and illustrating forward and rearward positions of the apparatus relative to the tractor;

FIG. 2 is a front elevation view of the apparatus of

FIG. 1 and illustrating the boom and supporting structure being oriented in a variety of operative positions;

FIG. 3 is a top plan view of the structure of FIG. 1 and illustrating the range of swinging movement of the boom and supporting structure;

FIG. 4 is an enlarged fragmentary sectional view taken in the direction of arrows 4—4 of FIG. 1;

FIG. 5 is an enlarged fragmentary front elevation view taken in the direction of arrow 5 of FIG. 1;

FIG. 6 is an enlarged fragmentary top plan view of the mechanism for swinging the boom between the positions shown in FIG. 3;

FIG. 7 is an enlarged fragmentary side elevational view partly in cross section of the boom supporting structure, inertia shaker mechanism, and a latch mechanism of the invention;

FIG. 8 is a partial sectional view taken in the direction of arrows 8—8 of FIG. 7;

FIG. 9 is an enlarged fragmentary sectional view taken in the direction of the arrows 9—9 of FIG. 7;

FIG. 10 is a fragmentary side elevation view of the latch mechanism of FIG. 7 in an open or released position;

FIG. 11 is a fragmentary side elevation view similar to FIG. 7 but on a further enlarged scale illustrating further components of the inertia shaker mechanism of the invention;

FIG. 12 is an enlarged view partly in section of the boom and clamp assembly of the invention;

FIG. 13 is a schematic view of the hydraulic control system for the tree shaker apparatus;

FIG. 13A is a schematic view of the boom and clamp assembly of the invention illustrating the clamp assembly in a retracted position;

FIG. 13B is a schematic view of the boom and clamp assembly illustrating the clamp assembly in an extended position;

FIG. 13C is a schematic view of the boom and clamp assembly illustrating the clamp assembly in a closed position; and FIG. 13D is a schematic view of the boom and clamp assembly illustrating the clamp assembly in an open position.

DESCRIPTION OF THE PREFERRED EMBODIMENT

Referring first to FIG. 1 there is shown a tractor 10 of the agricultural type upon which the tree shaker apparatus of the invention is adapted to be mounted. In general the apparatus includes a frame 11 on the tractor, a yoke 12 on the frame 11, a boom carriage assembly 13 on the yoke 12, a boom 14 on the carriage assembly 13, and an inertia shaker mechanism 15 and a clamp structure 16 on the boom 14.

The frame 11 includes a pair of track members 17 and 18 mounted on opposite sides respectively of the tractor 10 and extending longitudinally thereof in parallel relation. A plurality of cross braces 19 extend between the track member 17 and 18 at spaced intervals along the length of the frame. The entire frame 11 is adapted to be mounted on the tractor 11 by means of brackets and bolts shown generally at 20 and 21.

In accordance with a feature of the invention the yoke 12 and the track members 17 and 18 are cooperatively arranged so that the yoke is movable to selected positions longitudinally relative to the tractor. As shown generally in FIGS. 1 through 3 the yoke 12 comprises an inverted U-shaped member mounted on the track members 17 and 18 and extending upwardly and transversely of the tractor so as to straddle the same. The yoke 12 is rollably supported on the track members 17 and 18 by roller assembles 22 and 23 respectively. As shown in FIG. 4 the track member 17 includes a rail portion 24 extending the length thereof and including a laterally disposed flange 25. The roller assembly 22 includes a pair of upper rollers and a pair of lower rollers, one of each pair being shown at 26 and 27 respectively on opposite surfaces of the flange 25. It will be understood that the roller assembly 23 is constructed in the same manner as above described.

Power driven means are provided for moving the yoke 12 on the track members 17 and 18. As shown generally in FIG. 3 a pair of chains 28 and 29 are coupled to the roller assemblies 22 and 23 respectively. The chains 28 and 29 are journalled on pairs of sprockets 30 and 31 and 32 and 33 respectively, mounted on the track members 17 and 18 respectively. As shown in FIG. 5 the sprockets 31 and 33 are mounted on a shaft 34 which is adapted to be driven by a hydraulic motor 35 of the rotary type.

The boom carriage assembly 13 is pivotally mounted on the yoke 12 for swinging movement about vertical and horizontal axes. The assembly 13 includes a first link 36 in the form of a substantially rectangular frame piovtally coupled at its forward end to a mounting bracket 37 which is journalled on a stud 38 extending upwardly from the top of the yoke 12. The link 36 is pivotally coupled to the mounting bracket 37 by means of a pivot pin 39 defining a horizontal pivot axis. A second link 40 in the form of a substantially rectangular frame is pivotally coupled to the rearward end of the link 36 and extends forwardly a substantial distance beyond the forward end of the link 36. The link 40 is pivotally coupled to the link 36 by means of a pivot pin 41 defining a horizontal pivot axis.

As best shown in FIG. 2 a hydraulic ram 42 is pivotally coupled between the mounting bracket 37 and the link 36 for pivoting the link 36 about the pivot pin 39. Another hydraulic ram 43 is pivotally connected between the link 36 and the link 40 for pivoting the link 40 about the pivot pin 41.

The boom carriage assembly 13 is swingable relative to the yoke 12 about a vertical axis by a power mechanism best shown in FIG. 6. A hydraulic ram 44 is pivotally coupled between the yoke 12 and an arm 45 which is pivotally coupled to the yoke 12 as shown. An arm 46 is rigidly connected to the mounting bracket 37 and a link member 47 is pivotally connected between the arms 45 and 46. Actuation of the ram 44 to swing the mounting bracket 37 between its solid line and dotted line positions is reflected in a swinging movement of the boom 14 between its solid line and dotted line positions shown in FIG. 3.

The boom 14 and the associated shaker mechanism 15 are movable longitudinally on the link 40 to selected positions facilitating positioning the clamp structure 16 proximate to a tree to be gripped and shaken. As shown generally in FIG. 3 the link 40 of the boom carriage assembly includes a pair of parallel tracks 48 and 49 each in the form of an inwardly opening channel member.

As shown in FIG. 7 the rearward portion of the boom 14 is secured on a mounting frame 50 rollably received on the tracks 48 and 49. The mounting frame 50 includes a longitudinal beam 51 having bracket assemblies 52 and 53 at opposite ends thereof to which the boom 14 is coupled. Four leg members are secured to and extend downwardly from the beam 51 and each has a roller mounted on the lower end thereof. Two of the leg members are shown at 54 and 55 having rollers 56 and 57 respectively which are received in the track 48. It will be understood that the other two leg members are disposed on the opposite side of the beam 51 so that the respective rollers are receivable in the other track 49.

A hydraulic ram 58 is mounted on the link 40 between the tracks 48 and 49 for moving the boom to selected positions along the length of the link 40. The ram 58 includes a piston rod 59 having a pair of sprockets 60 and 61 mounted on the outer end thereof in side-by-side relation as best shown in FIG. 8. A drive chain 62 is connected at 63 to the ram 58 and extends forwardly for mounting on the sprocket 60. The chain 62 extends rearwardly from the sprocket 60 in a lower run 64 for mounting on a sprocket 65 journalled on the rearward end of the link 40. The chain 62 extends forwardly from the top of the sprocket 65 for connection to a longitudinally extending rod 66. Connected to the forward end of rod 66 is a second chain 67 which extends forwardly for mounting on a sprocket 68 journalled on the forward end of the link 40. The chain 67 extends rearwardly from the lower portion of the sprocket 68 in a lower run 69 for mounting about the sprocket 61. The chain 67 extends forwardly from the top of the sprocket 61 in an upper run 70 and is connected to the link 40 at 71.

Referring still to FIG. 7 the rod 66 carries a transversely extending member 72 adapted to be releasably engaged by a latch mechanism mounted on the mounting frame 50. The latch mechanism includes a pair of jaw members 73 and 74 pivotally coupled at 75 and 76 respectively to the beam 51. Transversely extending concave plates 77 and 78 are mounted on the jaw members 73 and 74 respectively in opposed relation to grip the member 72 therebetween.

A linkage mechanism is provided through which the jaw members may be swung toward and away from each other. A lever arm 79 is pivotally mounted at 80 on the beam 51 at a point rearwardly of the jaw members. Bars 81 and 82 are pivotally connected between the lever arm 79 and the jaw members 73 and 74 respectively.

A hydraulic ram 83 is pivotally coupled between the coupling 75 and the lever arm 79 for swinging the jaw members away from each other as shown in FIG. 10. A compression spring 84 is interposed between the jaw member 73 and the mounting frame 50 for normally biasing the jaw members toward each other to grip the member 72.

The latch mechanism is arranged to permit the jaw members to be swung toward and away from the member 72 without interference by the rod 66. Each of the plates 77 and 78 is provided with an opening through which the rod 66 extends. Such an opening is shown in FIG. 9 at 85 defined through the plate 77.

In the preferred embodiment of the invention the principal components of the above described latch mechanism are arranged in pairs on opposite sides of the beam 51. Thus it will be seen in FIG. 9 that the jaw member 73 has a counterpart at 73' to which the plate 77 is likewise secured. In like manner each of the components 74, 79, 81, and 82 has a counterpart on the opposite side of the beam 51 for greater strength and durability of latch mechanism.

The details of the inertia shaker mechanism 15 will be seen with reference to FIGS. 7 and 11. As shown in FIG. 7 the shaker mechanism includes a pair of intermeshed gears 86 and 87 mounted on shafts 88 and 89 respectively extending transversely across the beam 51. Semi-circular weights 90 and 91 are secured to the gears 86 and 87 respectively. It will be noted that the weights 90 and 91 are eccentrically mounted on the respective gears and are oppositely disposed relative to each other. With reference to FIG. 11 it will be seen that a pair of wheels 92 and 93 are disposed on the shafts 88 and 89 respectively so as to be positioned on the opposite side of the beam 51 from the gears 86 and 87. Semi-circular weights 94 and 95 are eccentrically mounted on the wheels 92 and 93 respectively and are oppositely disposed relative to each other. It will be seen that the weights 90 and 94 are disposed directly opposite each other. Similarly the weights 91 and 95 are also disposed directly opposite each other but are angularly disposed approximately 180 degrees relative to the weights 90 and 94.

As shown in FIG. 7a hydraulic motor 96 of the rotary type is mounted on the mounting frame 50 and as shown in FIG. 11 includes a drive pulley 97. A flexible drive belt 98 is trained about the pulley 97 and the wheel 92, with the outer peripheral surface of the belt 98 engaging the periphery of the wheel 93 as shown.

As will be subsequently described in detail the latch actuating ram 83 is operative torelease the latch mechanism as shown in FIG. 10 in response to actuation of the shaker motor 96. The motor 96 drives the wheel 92 and gear 86 in one direction and the gear 87 and wheel 93 in the opposite direction. Since the weights 90 and 94 are oppositely disposed relative to weights 91 and 95, it will be seen that the vertical components of inertial force will be substantially cancelled. The net effect of the inertial forces is to drive the mounting frame 50 and the boom alternately back and forth on the link 40 in the direction of the longitudinal axis of the boom. Consequently very little vibratory force is transmitted to the link 40.

The boom 14 and the associated clamp structure 16 are shown in detail in FIG. 12. The boom includes an elongated cylinder 99 mountable on the mounting frame 50 as shown in FIG. 7 and extending forwardly toward the clamp structure 16. First and second annular pistons 100 and 101 respectively are slidably received within the cylinder 99 and are axially spaced within the cylinder as shown. A tubular member 102 is threadedly connected to the piston 100 and extends outwardly beyond the end of the cylinder 99. A tubular element 103 is connected to the piston 101 and extends through the piston 100 and tubular member 102 outwardly beyond the end of the member 102 as shown.

The clamp structure 16 includes a pair of relatively movable jar assemblies 104 and 105 adapted to grip a tree limb therebetween. The jaw assemblies 104 and 105 are connected to the outer ends of the members 102 and 103 respectively.The jaw assembly 104 includes an arm 106 having a hub portion 107 which is mounted on a mounting sleeve 108 welded to the end of the tubular member 102. A lock nut 109 holds the hub portion 107 on the mounting sleeve 108 as shown. The arm 106 includes a portion 110 extending laterally and forwardly from the hub portion 107, a portion 111 extending forwardly from the portion 110, and a portion 112 extending laterally from the portion 111 across the extended center line of the cylinder 99 in axially spaced relation to the outer end of the cylinder. A pair of flexible pads 113 and 114 are mounted on the arm portion 112 and are disposed to face rearwardly toward the cylinder 99.

The jaw assembly 105 includes a yoke 115 having a central hub portion 116. A cylindrical rod 117 is fixed within the tubular element 103 and extends beyond the outer end of the element 103 as shown. The hub portion 116 is keyed on the rod 117 by a key member 118 and the yoke 115 is retained on rod 117 in abutting relation to the outer end of the tubular element 103 by a bolt assembly 119.

A pair of flexible pads 120 and 121 are mounted on the yoke 115 in opposed relation to the pads 113 and 114. Each of the pads includes an annular rib or flange 122 seated in a circular recess 123 defined in the respective members 112 and 115. An annular plate 124 engages the rib 122 and is secured in position by a bolt 125 and nut 126 as shown.

The yoke 115 includes a tab 127 extending toward the arm 110 and is received in a slot 128 defined along the length of the arm portion 111.

A gland 129 is threadedly coupled to the outer end of the cylinder 99 and includes suitable sealing rings encircling the tubular member 102. An annular expansible chamber 130 is defined axially between the piston 100 and the gland 129 and radially between the fember 102 and cylinder 99. Another expansible chamber 131 is defined between the pistons 100 and 101. A third expansible chamber 132 is defined between the piston 101 and a head member 133 secured to the end of the cylinder as shown.

The jaw assemblies 104 and 105 are adapted to be rotated as a unit about the longitudinal axis of the boom at any point along the extension of the jaw assemblies from the cylinder 99. A spool 134 is journalled within the head 133 and extends axially of the boom as shown. An elongated tube 135 is secured to the spool 134 and extends axially of the boom within the tubular element 103. A sleeve 136 is secured to the outer end of the tube 135. An elongated bar 137 is fixed to the end of the rod 117 and extends axially through the sleeve 136 and the tube 135. The bar 137 is hexagonal in cross section as is the central bore of the sleeve 136 through which the bar 137 is slidably received. A sprocket 138 is keyed and bolted on the spool 134.

It will be seen that rotation of the sprocket 138 rotates the spool 134, tube 135, and sleeve 136. The complementary engagement of the sleeve 136 on bar 137 insures that the bar 137 is likewise rotated regardless of its longitudinal or axial position within the cylinder. Since the bar 137 is fixed to the rod 117 and the rod 117 is fixed within the tubular element 103, it will be seen that the yoke 115 is rotated. The engagement of the tab 127 in the slot 128 imparts conjoint rotation to the arm 110 about the longitudinal axis of the boom.

The means for rotating the sprocket 138 will be seen with reference to FIG. 11. A hydraulic motor 139 of the rotary type is mounted on the boom 14 by a bracket assembly 140 and is adapted to drive a sprocket 141. A chain 142 is trained about the sprockets 138 and 141.

Referring again to FIG. 12 each of the chambers 130, 131, 132, is adapted to be connected to a source of pressure fluid. The chamber 130 is supplied with pressure fluid through a fitting 143 mounted on the cylinder 99 in communication with a port 144 defined through the cylinder wall proximate to the gland 129.

Pressure fluid is communicated to the chamber 131 in the following manner. The spool 134 includes a pair of axially spaced annular lands 145 and 146. A port (not shown) extends through the head member 133 in communication with the annular space defined between the lands 145 and 146. The spool 134 is cross drilled at 147 and communicates with a bore 148 defined axially through the spool so as to communicate with the interior of the tube 135. Ports 149 are defined through the tube 135 proximate to the sleeve 136 so as to communicate with the interior of the tubular element 103. Ports 150 are defined through the element 103 proximate to the piston 101 so as to communicate with the chamber 131.

Fluid pressure is admitted into the chamber 132 by means of a bore (not shown) defined through the head member 133 in communication with the chamber 132.

The tree shaker apparatus of the invention is hydraulically operable by a system shown schematically in FIG. 13. Hydraulic power is provided by pumps 151 and 152 which draw hydraulic fluid from a sump 153, all of which being part of the hydraulic system of the tractor 10. The pump 151 supplies fluid pressure to a pressure line 154. A plurality of valves 155, 156, 157, 158, and 159 are connected in series with the pressure line 154 which, as will be described, leads back to the sump. In the preferred embodiment of the invention each of the valves 155 through 159 comprises a three position, six way, spring centered, manually operated, open center type flow control valve of known construction.

The valves 155 through 159 are arranged to control the hydraulic motors 44, 43, 139, 42, and 35 respectively through suitable fluid lines, check valves, and pressure relief valves as shown. A pressure line 160 branches from the pressure line 154 and connects the valves 155 through 159 in series as shown. A line 161 connects each of the valves to the sump. The connections of the valves 155 through 159 with the pressure lines 154 and 160 enables the valves to be actuated concurrently. For example, the valve 156 may be actuated to operate the motor 43 during actuation of the valve 155 to operate the motor 44.

Preferably a priority type flow divider 162 is connected in line 154 for limiting the flow of pressure fluid to the valves 155 through 159 to a preselected value despite variations in the output of the pump 151. The balance of the pressure fluid is diverted through a line 163 to another portion of the hydraulic system to be described.

The pump 152 supplies pressure fluid through a pressure line 164 to a plurality of valves 165, 166, and 167 connected in series by the line 164 which leads back to the sump. The valve 165 through 167 are preferably of the same type as the above described valves 155 through 159. A pressure line 168 branches from the pressure line 164 and connects the valves 165 through 167 in series as shown. A line 169 connects each of the valves to the line 164 and thus to the sump. It will be seen that the valves 165 through 167 are capable of concurrent actuation in the same manner as the above described valves 155 through 159.

A priority type flow divider 170 is connected in the pressureline 164 for limiting the flow of pressure fluid to the valves 165 through 167 to a pre-selected value despite variations in the output of the pumps.

The relationship of the pumps 151 and 152 with the banks of valves 155 through 159 and 165 through 167 will now be summarized. The output of pressure fluid from the pump 151 flows to pressure line 154 to the flow divider 162 which diverts a portion of the flow through line 163 and past a check valve 171 to the pressure line 164. A predetermined flow of pressure fluid continues through the pressure line 154 to the valves 155 through 159. It will be seen that when all the valves 155 through 159 are in the neutral position shown the pressure fluid will flow from the pressure line 154 to the line 163, past the check valve 171, whereupon it will join the output of the pump 152 in the pressure line 164. Accordingly the output of both pumps is available at the bank of valves 165 through 167 when the valves 155 through 159 are in the neutral position. It will further be seen that the check valve 171 insures that the output of the pump 152 is constantly available at the valves 165 through 167 regardless of the fluid pressure requirements at the valves 155 through 159.

In general the valves 165 and 166 are arranged to control the extension, retraction, and clamping of the boom 14 and clamp structure 16 and the actuation of the hydraulic ram 58. The expansible chamber 130 is connected to the valve 165 through a line 172. The expansible chamber 131 is connected to the valve 166 by a line 173 and the expansible chamber 132 is connected to the valves 165 and 166 by lines 174 and 175. The line 172 includes pilot-operated check valves 176 and 177 which are unseated in response to pressurization of lines 173 and 174 respectively. The line 174 includes a pilot-operated check valve 178 which is unseated in response to pressurization of line 172. A pilot-operated check valve 179 is connected in parallel with the check valve 178 and is unseated in response to pressurization of line 173.

To extend the clamp structure 16 away from the boom 14, the valve 165 is actuated to direct pressure fluid from pressure line 168, through line 175 and 174 to the chamber 132. The fluid trapped in the chamber 131 exerts a pressure in line 173 sufficient to unseat the check valve 176, while the pressure in line 174 unseats check valve 177. Fluid in chamber 130 is thus permitted to flow through the line 172 back to the sump through valve 165. Accordingly the pistons 100 and 101 are driven from the retracted position of FIG. 13A to the extended position of FIG. 13B. A pressure relief valve 180 is connected to the line 174 for relieving excess pressure in chamber 132 due to pressure buildup caused by thermal expansion of the oil locked in the chamber 132 during exposure of the boom to high temperatures such as storage in direct sunlight. Small quantities of oil are discharged to the atmosphere to relieve extremely high pressures.

The boom is designed such that the jaw assemblies 104 and 105 separate or move away from each other to an open position in response to extension of clamp assembly 16 away from the boom 14. A pilot-operated shuttle valve 181 of known structure is connected between the lines 172 and 173 by lines 182, 183, and 184. The valve 181 is operable in response to pressures in lines 182 and 184 for alternately intercommunicating the chambers 130 and 131 or permitting flow directly through lines 183 and 184.

During the above described clamp extension the shuttle valve 181 is shifted from the position shown in FIG. 13 to a position permitting flow directly between chambers 130 and 131. The valve 181 shifts due to a throttle valve 185 being connected in the line 172 between the chamber 130 and the line 184. The throttle valve 185 creates a pressure drop thereacross in the line 172 as the fluid flows from the chamber 130. This decreases the pressure in line 184 so that it is less than that in line 182. Accordingly the valve 181 is shifted to intercommunicate the lines 182 and 183 and hence the chambers 130 and 131.

Referring again briefly to FIG. 12 it will be seen that the piston 100 has a greater end area exposed to chamber 131 than the opposite end area exposed to chamber 130. Due to the differential end area of the piston 100 and the inter-communication of chambers 130 and 131, the piston 100 is moved away from the piston 101, thereby effecting a separation of the jaw assemblies 104 and 105. Cavitation in chamber 131 is prevented since pressure fluid may flow from the chamber 130 into the chamber 131 through the shuttle valve 181.

In order to close the jaw assemblies 104 and 105 as shown in FIG. 13C to grip a tree limb therebetween, the valve 165 is moved to the neutral position and the valve 166 is actuated to deliver pressure fluid through lines 175 and 174 into chamber 132. This also permits chamber 131 to drain to the sump through line 173. Accordingly the piston 101 is driven to the left to move the jaw assembly 105 toward the jaw assembly 104. During this clamping step the piston 100 does not move since the fluid in chamber 130 is blocked by the check valve 176 in line 172. Moreover the relative pressure exerted on the shuttle valve 181 cause it to remain in the position shown in FIG. 13 thus preventing flow from the chamber 130 into line 173.

As the tree limb is gripped between the jaw assemblies 104 and 105 the pressure in chamber 132 will increase. A pressure relief valve V is connected between the lines 174 and 173 for relieving the excess pressure in chamber 132 to the sump during the clamping cycle while valve 166 is actuated. In order to open the clamp assembly as shown in FIG. 13B to release its grip on a tree limb, the valve 166 is actuated to deliver pressure fluid into chamber 131 through the line 173. At the same time chamber 132 is connected to the sump through lines 174 and 175. Accordingly the piston 101 is driven to the right to move the jaw assembly 105 away from the jaw assembly 104. During the unclamping step the piston 100 remains stationary since the fluid in chamber 130 is blocked by the check valve 177 in line 172. The shuttle valve 181 remains in the position shown.

To retract the clamp assembly 16 toward the boom 14, the valve 165 is actuated to permit pressure fluid to flow into the chamber 130 to line 172. It will be noted that a check valve 186 is connected in the line 172 thus permitting the fluid to by-pass the throttle valve 185. The check valve 178 is unseated permitting fluid in chamber 132 to flow through lines 174 and 175 and through the valve 165 to the sump.

The fluid in chamber 131 is blocked by the valve 166 in its neutral position shown. It will thus be seen that the pistons 100 and 101 will be driven to the right to retract the clamp assembly as shown in FIG. 13A. A pressure relief valve 187 is connected to the line 172 for relieving excess pressure in chamber 130 due to pressure buildup caused by exposure of the boom to high temperatures such as those created by storage in direct sunlight. This thermal relief prevents damage to the boom due to thermal expansion of the oil locked in chamber 130 by discharging small quantities of oil to the atmosphere.

During the retraction step pressure may rise in the chamber 131 due to a decrease in the volume of the chamber. The volume decreases since the pistons 100 and 101 move to the right to gradually encompass an increasing portion of the tube 135 (FIG. 12) within the chamber 131. When the pressure in chamber 131 exceeds that within the chamber 130 the shuttle valve 131 will be actuated to permit some flow from the chamber 131 into the chamber 130. Consequently excess pressure is relieved and the structure is not damaged.

Referring again briefly to FIG. 7 it will be recalled that the hydraulic ram 58 is provided for moving the entire boom assembly to desired positions longitudinally on the link 40. As shown schematically in FIG. 13 the opposite ends of the ram 58 are connected by lines 188 and 189 to the lines 174 and 172 respectively. It will thus be apparent that delivery of pressure fluid through the line 174 to extend the clamp assembly from the boom will also cause pressure fluid to flow through the line 188 to actuate the ram 58. Referring to FIG. 7 the above hydraulic action drives the rod 59 to the left which rolls the boom assembly to the right on the link 40. Thus the entire boom is moved forwardly on the link 40 as the clamp assembly is extended from the boom.

Retraction of the clamp assembly back toward the boom results in actuation of the ram 58 to move the boom rearwardly on the link 40. As pressure fluid is directed through line 172 into the chamber 130 the line 189 likewise directs pressure fluid into the opposite end of ram 58.

The relative rates of movement of the boom on the link and the clamp relative to the boom during retraction and extension may be selectively varied. Toward that result the throttle valve 185 is of the variable type, as is a throttle valve 190 in the line 188. During extension of the clamp assembly away from the boom, fluid is forced from the chamber 130 through the throttle valve 185 which restricts the flow in accordance with the preselected setting of the valve. This restriction to the flow permits the ram 58 to actuate at a faster rate since no restrictions are imposed in the line 189 leading to the sump. During retraction of the clamp assembly the throttle valve 190 restricts the flow in the line 188 permitting the clamp assembly to retract toward the boom at a faster rate than that of the ram 58. Since the throttle valve 190 is of the variable type it restricts the flow in accordance with its preselected setting.

It will be noted that a check valve 191 is connected in the line 188 to permit pressure fluid to bypass the throttle valve 190 as it flows toward the ram 58. Pilot-operated check valves 192 and 193 are connected in the lines 188 and 189 respectively to lock the ram 58 against movement and thus hold the boom in the desired position on the link 40 particularly when angulated upwardly or downwardly as shown in FIG. 2.

The shaker motor 96 is controlled by the valve 167 which is operable to direct pressure fluid to the motor through a pressure line 194. A line 195 is connected between the motor 96 and the line 164 for returning fluid to the sump. The branch line 196 is connected from the line 195 to the valve 167 to provide a parallel path to the sump when the valve is actuated.

As above mentioned the ram 83 is actuated to release the engagement of the latch mechanism with the member 72 (FIG. 10) in response to actuation of the shaker motor 96. Toward that result a line 197 interconnects the pressure line 194 with the ram 83. Thus, as shown in FIGS. 9 and 10, the ram 83 moves the jaws 73 and 74 away from the member 72 to release the mounting frame 50 and boom 14 for reciprocating movement on the link 40 as the shaker motor 96 is actuated.

It is possible that a tree branch gripped by the clamp assembly will be sufficiently flexible to permit the open jaws 73 and 74 (FIG. 10) to strike the interposed member 72 during the shaking operation. To prevent any damage that could result a pilot-operated, spring return, two-way valve 198 is connected by lines 199 and 200 to the opposite ends of the ram 58. The valve 198 is actuated in response to pressure in the line 194 to intercommunicate the opposite ends of the ram 58 during operation of the shaker motor 96. Accordingly the member 72 (FIG. 10) is free to move if struck by the jaws 73 and 74 since the piston of the ram 58 is free to reciprocate.

The flow of pressure fluid to the shaker motor 96 will be stopped upon moving the valve 167 back to the neutral position shown. Since the mass being reciprocated tends to continue reciprocating under inertial forces, the jaws 73 and 74 of the latch mechanism must not close against the member 72 until the reciprocation of the boom has stopped. This result is obtained by connecting a restrictor 201 in the line 197 to delay the closing action of the spring 84 until after the reciprocation has ceased.

Since the motor 96 will continue to rotate for a short time after shutting off the pressure fluid, cavitation could result. Accordingly a line 202 is connected between the lines 194 and 195 so that fluid will continue to flow through the motor. A check valve 203 is connected in the line 202 so that pressure fluid will flow to only one side of the motor 96 through the line 194 upon actuation of the motor.

The overall operation of the tree shaker apparatus now will be briefly summarized.

The entire structure is movable on the frame 11 between the solid line and dotted line positions of FIG. 1 in response to selective actuation of the valve 159 to drive the hydraulic motor 35 in the desired direction. Actuation of the valve 158 controls the ram 42 to selectively raise or lower the link 36 about the pivot 39 as shown in FIG. 2. The valve 156 is actuated to drive the ram 43 so that the link 40 is pivoted about the pivot 41 between the solid line and dotted line positions in FIG. 2. As above explained the hydraulic circuitry permits concurrent operation of the rams 42 and 43 if desired. Actuation of the valve 155 controls the ram 44 (FIG. 6) to swing the boom carriage assembly 13 and the boom 14 between the solid line and dotted line positions of FIG. 3.

Extension and retraction of the clamp assembly 16 away from and toward the boom is controlled by selective actuation of the valve 165 which also controls the operation of the ram 58 to move the boom to selected positions on the link 40.

Upon positioning the clamp assembly 16 proximate to a tree branch to be gripped, the valve 157 is actuated to drive the motor 139 (FIG. 11) to rotate the clamp assembly as required. The boom is moved to dispose the jaw assemblies 104 and 105 on opposite sides of the branch, whereupon the valve 166 is actuated to grip the branch between the jaw assemblies.

The valve 167 is actuated to drive the shaker motor 96 and release the engagement of the latch mechanism (FIG. 10), whereby the boom is reciprocated to dislodge fruit from the tree. Upon completion of the shaking step the valve 166 is actuated to release the grip of the clamp assembly and the boom is then repositioned as required for a subsequent shaking step.

From the foregoing it will be seen that the tree shaking apparatus of the invention is uniquely suited to solve many of the problems associated with conventional machines.

Various changes falling within the scope and spirit of the claims may occur to those skilled in the art. The invention is therefore not to be thought of as limited to the specific embodiment set forth.

What is claimed is:

1. In a tree shaker apparatus adapted for mounting on a mobile support and including a clamp adapted to grip a tree for shaking fruit therefrom, the combination comprising:
 a frame mountable on the mobile support;
 a yoke mounted on said frame for slidable movement thereon to selected positions relative to the mobile support;
 a boom carriage assembly pivotally mounted on and disposed above said yoke;
 a boom movably mounted on said carriage assembly and having said clamp mounted on an outer end thereof; and
 an inertia shaker mechanism mounted on said boom for effecting longitudinal reciprocation of said boom with respect to said carriage assembly to thereby dislodge fruit from a tree engaged by said clamp.

2. The subject matter of claim 1, including means operatively connected to said boom for moving said boom to selected positions longitudinally on said carriage assembly to facilitate positioning said clamp relative to a tree to be gripped.

3. The subject matter of claim 1, including means operatively connected to said boom carriage assembly for pivoting same relative to said yoke about horizontal and vertical axes for orienting said boom relative to a tree to be gripped.

4. In a tree shaking apparatus, an elongated boom having a tree-gripping clamp on one end and a mounting frame on the other end, said clamp being adapted to grip a tree for shaking fruit therefrom;
 a boom carriage assembly receiving said mounting frame for movement longitudinally of said carriage assembly;
 means for moving said mounting frame to selected positions longitudinal on said carriage assembly to facilitate positioning said boom relative to a tree to be gripped;
 an inertia shaker mechanism mounted on said mounting frame for effecting longitudinal reciprocation of said boom relative to said carriage assembly to thereby dislodge fruit from a tree gripped by said clamp;
 said means including a latch mechanism releasably interconnecting said mounting frame and said carriage assembly and operative to release said mounting frame for movement with respect to said carriage assembly in response to actuation of said inertia shaker mechanism permitting rceiprocation of said boom without transmitting vibrations to said carriage assembly.

5. The subject matter of claim 4, including means operative to actuate said latch mechanism to interconnect said mounting frame and said carriage assembly in response to deactuation of said shaker mechanism thereby permitting said mounting frame to be repositioned longitudinally on said carriage assembly for a subsequent tree shaking operation.

6. The subject matter of claim 4, wherein said latch mechanism includes first and second jaws pivotally connected to said mounting frame in opposed relation to engage said carriage assembly, linkage means interconnecting said jaws, a hydraulic ram on said mounting frame coupled to said linkage means for swinging each of said jaws away from each other to release engagement with said carriage assembly in response to extension of said ram, and biasing means for swinging said jaws toward each other to re-engage said carriage assembly in response to retraction of said ram.

7. The subject matter of claim 4, wherein said means further includes a double-acting hydraulic ram on said carriage assembly, a member movable longitudinally of said carriage assembly in response to actuation of said ram, said latch mechanism being mounted on said mounting frame and including a pair of jaws arranged to receive said member therebetween, hydraulic motor means for actuating said shaker mechanism, hydraulic circuit means including pilot operated valve means for intercommunicating opposite ends of said hydraulic ram in response to actuation of said motor means, whereby said member is freely movable if struck by said jaws during reciprocation of said latch mechanism to thereby prevent damage to the apparatus.

8. In a tree shaker apparatus, a support;
  a mounting frame mounted on said support for movement longitudinally of said support;
  an elongated boom coupled to and extending from said mounting frame and having a clamp thereon for gripping a tree to dislodge fruit therefrom; and
  means for moving said mounting frame to selected positions longitudinally on said support to facilitate positioning said boom as a unit relative to a tree to be gripped by said clamp, said means including a power drive assembly on said support including a hydraulic ram, a chain coupled to said ram and journaled on said support, said chain carrying a member movable longitudinally of said support in response to actuation of said ram, and latch means carried on said mounting frame releasably engaged with said member permitting said boom to be moved on said support in response to actuation of said ram.

9. The subject matter of claim 8, including an inertia shaker mechanism carried by said mounting frame for effecting reciprocation of said boom on said support for dislodging fruit from a tree gripped by said clamp, said latch means including power means for releasing the engagement of said latch means with said member in response to actuation of said shaker mechanism permitting reciprocation of said boom without transmitting vibrations to said support.

10. The subject matter of claim 9, including means operative to actuate said latch means to engage said member in response to deactuation of said shaker mechanism, thereby permitting said boom to be moved on said support by said power drive assembly.

11. In a support structure for an elongated boom having a clamp adapted to grip a tree for dislodging fruit therefrom, said support structure including a base;
  a first link pivotally coupled at one end to said base for pivoting movement about a first horizontal axis;
  a second link in superposed relation to said first link and pivotally coupled to the other end of said first link for pivoting movement relative to said first link about a second horizontal axis, said boom being mounted on said second link;
  means operatively associated with said first link for pivoting same about said first horizontal axis to raise said second horizontal axis relative to said base; and
  means operatively associated with said second link for pivoting same about said second horizontal axis upwardly relative to said base and said first link, whereby said boom is movable to selected positions relative to said base to facilitate positioning said clamp relative to a tree to be gripped.

12. The subject matter of claim 11, including means coupling said first link on said base for swinging movement of said first and second links about a vertical axis whereby said boom is swingable about said vertical axis.

13. The subject matter of claim 11, in which said second link includes track means extending longitudinally thereof;
  said boom being mounted on said second link by means including rollers receivable on said track means, whereby said boom is movable on said second link longitudinally thereof to further facilitate positioning said clamp relative to a tree to be gripped.

14. The subject matter of claim 13, including an inertia shaker mechanism mounted on said boom for effecting longitudinal reciprocation of said boom on said track means to thereby dislodge fruit from a tree gripped by said clamp.

15. The subject matter of claim 11, including a mobile support adapted to carry the support structure by means including a track mounted on each side of the mobile support and extending longitudinally thereof in parallel relation, said base including a yoke comprising a generally U-shaped member vertically disposed on said track transversely thereof so as to straddle the mobile support, and means for moving said yoke to selected positions along the longitudinal extent of said tracks whereby the boom and the support structure are movable as a unit relative to the mobile support.

16. In a tree shaking apparatus, an elongated extensible boom having a tree-gripping clamp on one end and a mounting frame on the other end, said clamp being adapted to grip a tree for shaking fruit therefrom; a boom carriage assembly receiving said mounting frame thereon; first hydraulic means for extending and retracting said boom to dispose said clamp at selected positions relative to said mounting frame; second hydraulic means for moving said mounting frame to selected positions longitudinally on said carriage assembly; and control means operatively associated with said first and second hydraulic means for selectively varying the rate of relative movement of said clamp and said mounting frame.

17. In a tree shaker apparatus adapted for mounting on a mobile support and including a clamp adapted to grip a tree for shaking fruit therefrom, the combination comprising:
  a frame mountable on the mobile support;
  a yoke mounted on said frame for slidable movement thereon to selected positions relative to the mobile support;
  a boom carriage assembly pivotally mounted on said yoke;
  a boom movably mounted on said carriage assembly and having said clamp mounted on an outer end thereof;
  an inertia shaker mechanism mounted on said boom for effecting longitudinal reciprocation of said boom with respect to said carriage assembly to thereby dislodge fruit from a tree engaged by said clamp; and
  means for moving said boom to selected positions longitudinally on said carriage assembly to facilitate positioning said clamp relative to a tree to be gripped, said means including a power drive assembly on said carriage assembly and including a hydraulic ram, a member movable longitudinally of said carriage assembly in response to actuation of said ram, and latch means carried on said boom releasably engaged with said member permitting said boom to be moved on said carriage assembly in response to actuation of said ram.

18. In a tree shaker apparatus adapted for mounting on a mobile support and including a clamp adapted to grip a tree for shaking fruit therefrom, the combination comprising:
  a frame mountable on the mobile support;
  a yoke mounted on said frame for slidable movement thereon to selected positions relative to the mobile support;
  a boom carriage assembly pivotally mounted on said yoke;
  a boom movably mounted on said carriage assembly and having said clamp mounted on an outer end thereof;
  an inertia shaker mechanism mounted on said boom for effecting longitudinal reciprocation of said boom with respect to said carriage assembly to thereby dislodge fruit from a tree engaged by said clamp; and
  means for moving said boom to selected positions longitudinally on said carriage assembly to facilitate positioning said clamp relative to a tree to be gripped, said means including a latch mechanism releasably interconnecting said boom and carriage assembly and operative to release said boom with respect to said carriage assembly in response to actuation of said inertia shaker mechanism permitting reciprocation of said boom on said carriage assembly without transmitting vibration to said assembly.

19. The subject matter of claim 18, including means operatively connected to said latch mechanism for actuating same to interconnect said boom and carriage assembly in response to deactuation of said shaker mechanism thereby permitting said boom to be repositioned longitudinally on said carriage assembly for a subsequent tree shaking operation.

20. In a tree shaker apparatus adapted for mounting on a mobile support and including a clamp adapted to grip a tree for shaking fruit therefrom, the combination comprising:
a frame mountable on the mobile support;
a yoke mounted on said frame for slidable movement thereon to selected positions relative to the mobile support;
a boom carriage assembly pivotally mounted on said yoke;
a boom movably mounted on said carriage assembly and having said clamp mounted on an outer end thereof; and
an inertia shaker mechanism mounted on said boom for effecting longitudinal reciprocation of said boom with respect to said carriage assembly to thereby dislodge fruit from a tree engaged by said clamp, said frame including a track mounted on each side of the mobile support and extending longitudinally thereof in parallel relation, said yoke comprising a generally U-shaped member vertically disposed on said tracks transversely thereof so as to straddle the mobile support whereby said yoke may be moved longitudinally on said tracks providing clearance over the mobile support.

References Cited

UNITED STATES PATENTS

| | | | |
|---|---|---|---|
| 2,159,311 | 5/1939 | Berger | 56—328 |
| 3,105,345 | 10/1963 | Anderson et al. | 56—328 |
| 3,120,091 | 2/1964 | Gould et al. | 56—328 |
| 3,121,304 | 2/1964 | Herbst | 56—328 |
| 3,183,656 | 5/1965 | Shipley, Jr. | 56—328 |
| 3,377,786 | 4/1968 | Edgemond, Jr. | 56—328 |
| 3,457,712 | 7/1969 | Gould et al. | 56—328 |

RUSSELL R. KINSEY, Primary Examiner